Dec. 8, 1931.  A. J. PRATT  1,835,427
PLOW
Filed Oct. 7, 1929  3 Sheets-Sheet 1
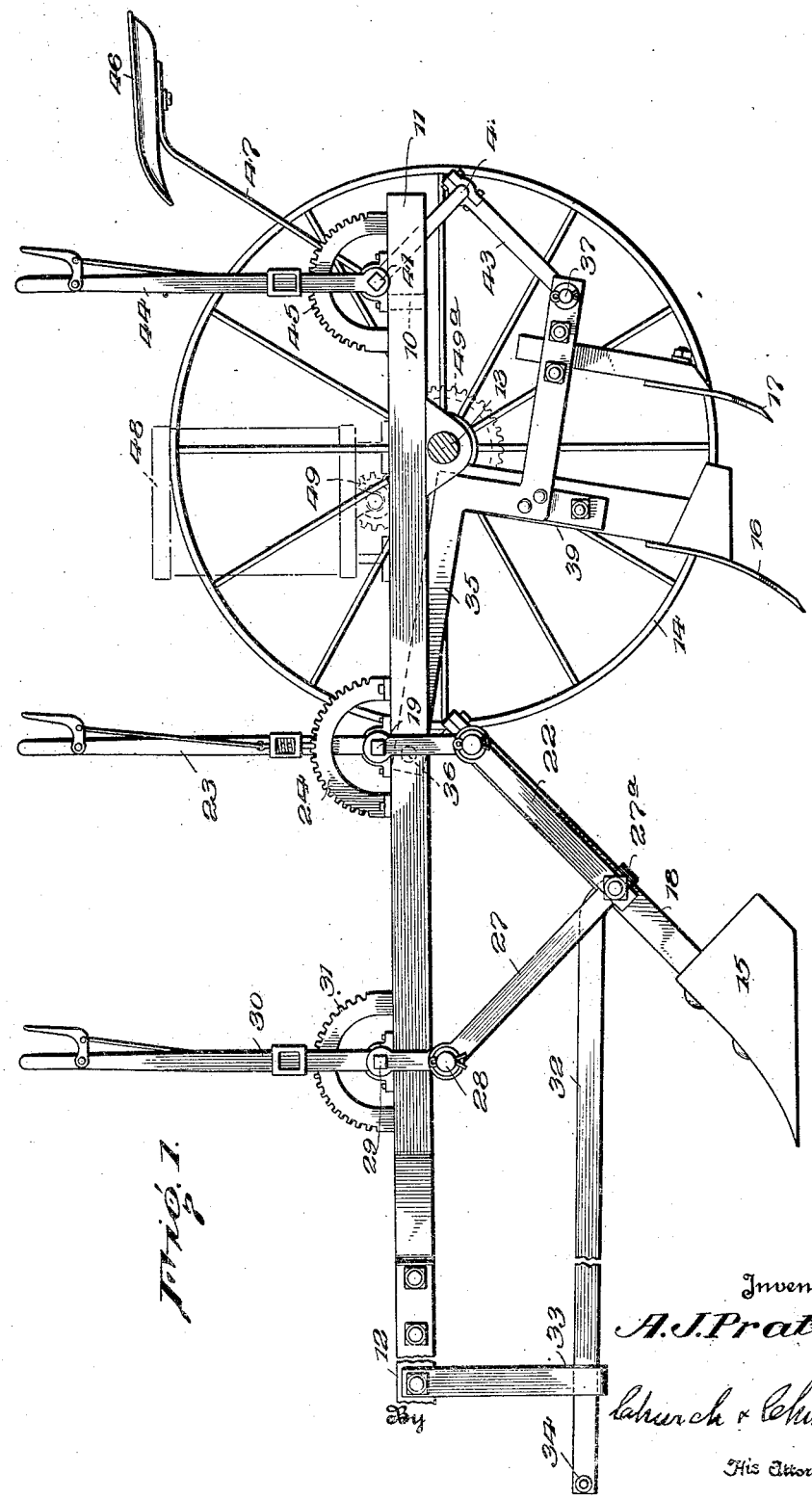
Inventor
A. J. Pratt,
By Church & Church
His Attorneys

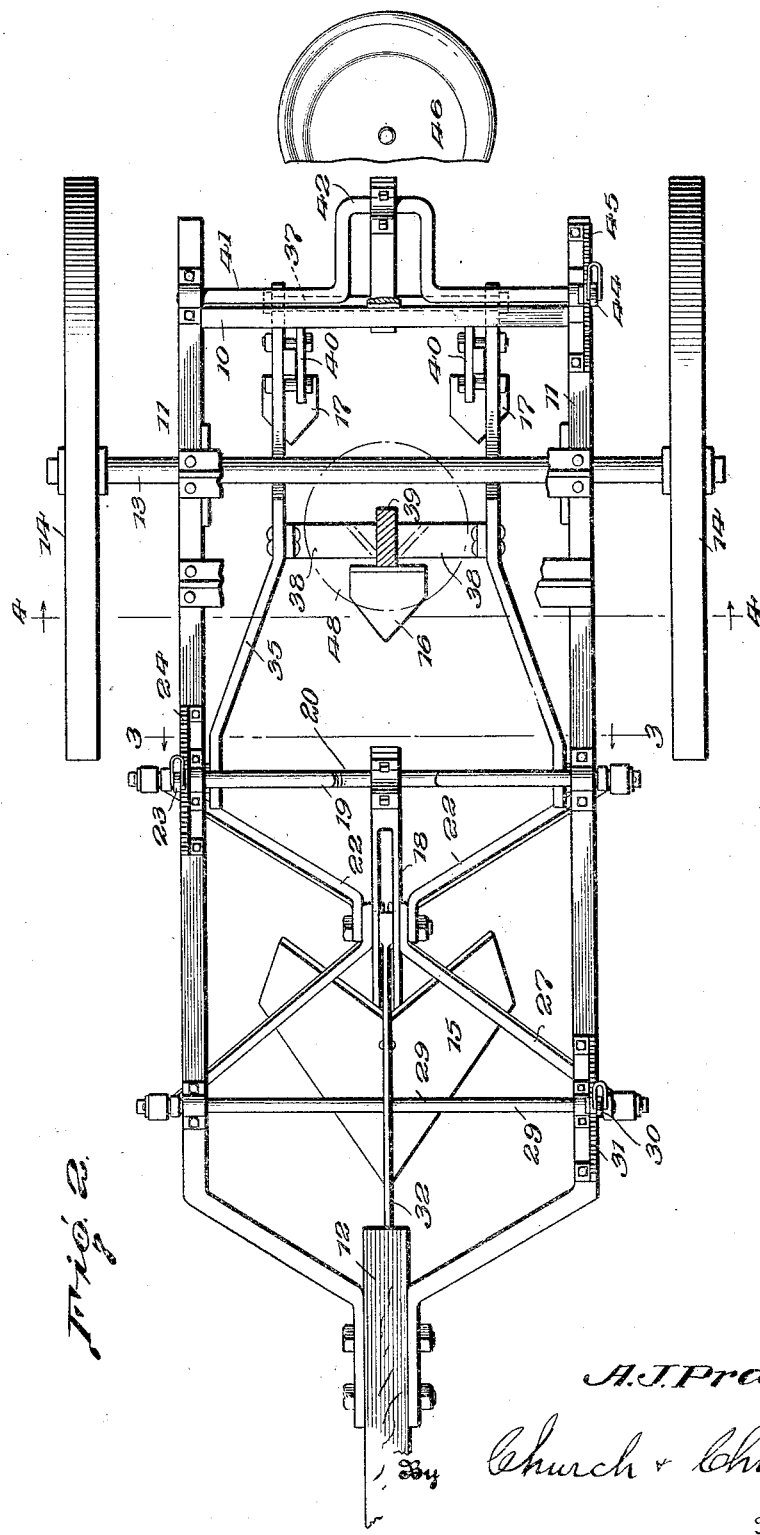

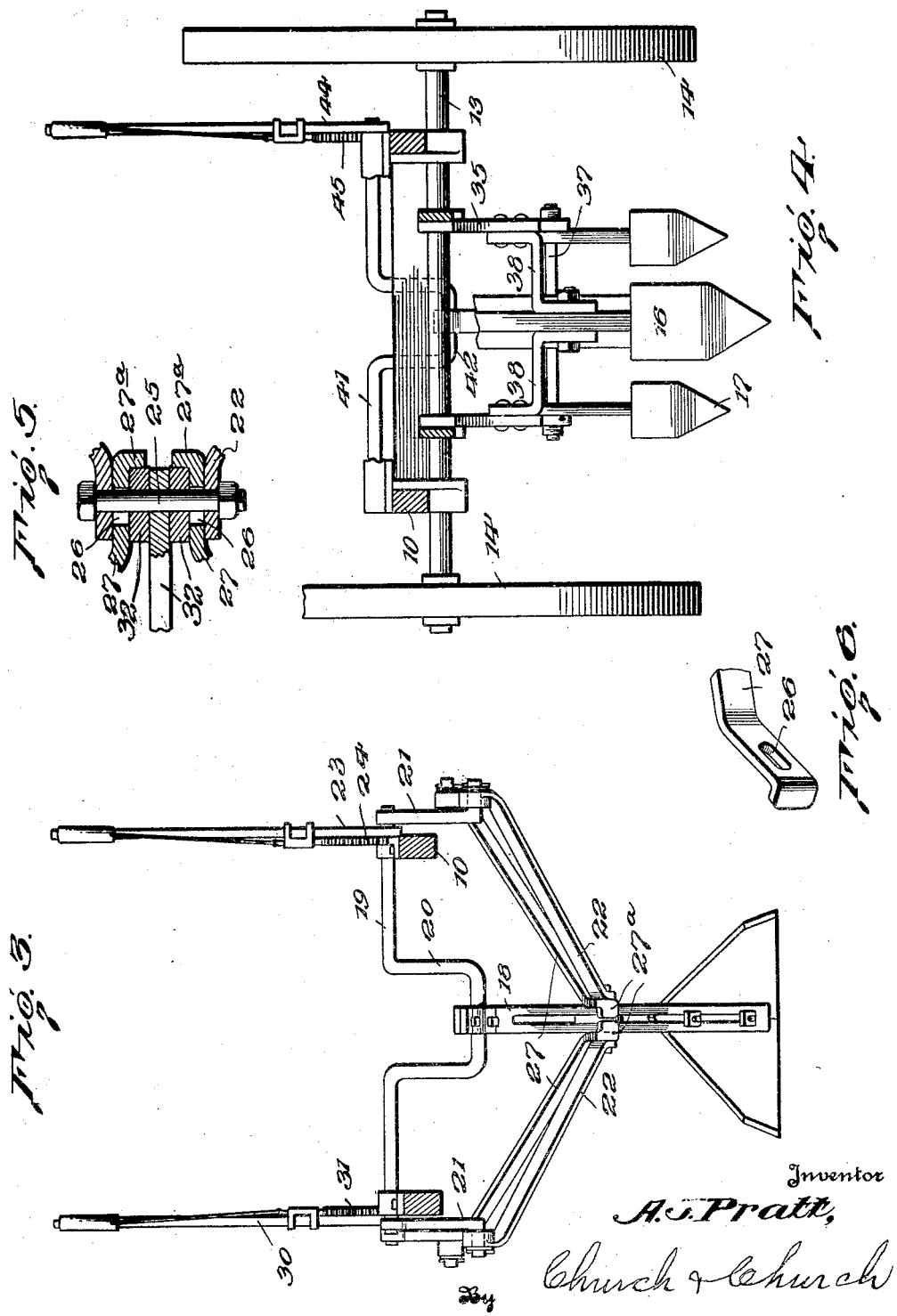

Patented Dec. 8, 1931

1,835,427

UNITED STATES PATENT OFFICE

ARCHIBALD J. PRATT, OF CROCKETT, TEXAS, ASSIGNOR OF ONE-HALF TO PHILIP BRISKMAN, OF CROCKETT, TEXAS

PLOW

Application filed October 7, 1929. Serial No. 397,936.

This invention relates to plows, and particularly to improvements especially applicable to planting plows.

Primarily, the object of the invention is to provide a mounting for the main plow wherein the plow point or plow share may be adjustable both longitudinally of the plow frame and vertically with respect thereto, these vertical and longitudinal adjustments also resulting in altering the inclination of the plow point or plow share. In this connection, the supplemental plow that forms the groove in which the seeds are deposited in a planting plow, as well as the covering plows, are also so mounted that they may be readily adjustable vertically to compensate for alterations in the position of the main plow. This supplemental plow and the covering plows are also adjustable longitudinally of the plow frame to a more or less limited extent.

A further object is to so design or arrange the mountings of the several plows that the main plow point is spaced from the supplemental plow point a distance sufficient to permit the soil turned up by the main plow to settle before the supplemental plow forms a groove for the seed, and, at the same time, the covering plows are located approximately in the same vertical plane as the axle for the ground wheels of the plow. This is important, because it not only results in a better balancing for the plow without extending the main frame members too far to the rear of the axle, but, at the same time, by having the covering plows located almost directly, if not directly, beneath the axle, there is secured the additional advantage of having the seeds covered by a uniform depth of soil.

A more detailed object consists in pivotally supporting the plow standard for the main plow share by a series of brace rods or the like, two of these rods having shoulders formed thereon for supporting said plow standard, whereby the load composed of said plow standard and plow share need not necessarily be supported by a pivot pin connecting the plow standard and rods.

With these and other objects in view, the invention consists in certain details of construction and combinations and arrangements of parts, all as will hereinafter be more fully described and the novel features thereof particularly pointed out in the appended claims.

In the accompanying drawings,

Figure 1 is a side elevational view of a plow embodying the present improvements, one ground wheel being omitted and the seed hopper and a portion of its operating mechanism being shown in outline;

Fig. 2 is a top plan view, a portion of the seat support being omitted;

Fig. 3 is a sectional view on the line 3—3 of Fig. 2, looking in the direction of the arrows;

Fig. 4 is a sectional view on the line 4—4 of Fig. 2, looking in the direction of the arrows;

Fig. 5 is a detail sectional view of the connection between the plow standard and the connecting rods therefor; and Fig. 6 is a detail perspective view of an end of one of said connecting rods.

In accordance with the usual practice, there is a main frame having a cross bar 10 at the rear thereof and side longitudinal bars 11 extending from said cross bar forward to and secured to a tongue 12. This frame is mounted upon an axle 13, and upon the latter, at the ends thereof, are mounted the ground wheels 14. While certain features of the present invention are applicable to various types of plows, the one to which it is especially applicable, and which is illustrated herein, is of the type known as a planting plow, in that it is provided with a main plow point or plow share 15, a supplemental plow point or furrow opener 16, and covering plows 17. In order that the main plow point 15 may be adjusted to vary its inclination or alter its position both longitudinally and vertically with respect to the main frame, said plow share is mounted upon the plow standard 18, whose upper end is pivotally supported or suspended from the main frame. Preferably, there is journaled transversely of the main frame, in suitable bearings on said members 11, a crank shaft 19, having an offset portion 20, intermediate the side members 11, and additional cranks or offset portions 21 at the ends thereof on the exterior of said side members. The upper end of the plow standard 18 is pivotally secured to crank portion 20, said plow standard being braced laterally by brace rods 22 whose upper ends are secured to the crank portions 21 of crank shaft 19. Also secured to said crank shaft is an operating lever 23 for rocking said crank shaft. This lever may be held in any desired position by the usual segment arrangement indicated at 24. At a point intermediate its ends, plow standard 18 carries a pivot pin 25, extending through the lower ends of the brace rods 22 and through slots 26 in connecting rods 27, said connecting rods being loosely connected at their upper ends to crank portions 28 formed on a second crank shaft 29 at the forward end of the main frame. This crank shaft 29 is also capable of being rocked by lever 30 that may be held in any desired position by the usual pawl and segment 31. With such an arrangement, it will be seen that by manipulating lever 23 and rocking crank shaft 19, the plow standard 18 and the main plow shaft 15 may be advanced or retracted with respect to the main frame and, at the same time, said plow share will also be raised or lowered to some extent and its inclination varied or altered. Likewise, by actuating hand lever 30, the plow standard 18 can be moved on its pivotal center so as to raise and lower the plow share 15, such movement also advancing or retracting it somewhat and, at the same time, altering the inclination thereof. Again, by actuating first one and then the other of said hand levers 23, 30, the plow point may be raised and lowered without affecting, ultimately, its position longitudinally of the frame, or its inclination with respect to the ground. To limit the rearward movement of plow standard 18, there is attached to the same a rod 32, whose forward end projects through a guide 33, withdrawal of the rod from said guide being prevented by cross pin 34.

Referring particularly to Figures 3, 5, and 6, it will be seen that practically no load is carried by the pivot pin 25, but by the connecting rods 27. The strain or load is taken off of pin 25 by forming load bearing members on said connecting rods, this being preferably done by offsetting the ends of said rods as at 27a, these offset end portions engaging the underside of the plow standard 18.

In order that the supplemental plow or furrow opener 16 and the covering plow 17 may also be adjusted to compensate for adjustments of the main plow 15, these elements are mounted on a supplemental frame extending toward the rear of the main frame. Preferably, this supplemental frame consists of side rods 35 pivoted on pins 36 in the side members 11 of the main frame. At their rear ends, bars 35 are connected by a cross member 37, and they are also connected intermediate their ends by cross bars 38, between which the stem or upwardly extending portion 39 of the furrow opener 16 is secured. The covering plows 17 may be clipped to the side bars 35, as shown at 40. Journaled at the rear of the side members 11, there is a third crank shaft 41, from whose offset portion 42 this supplemental frame is suspended by connecting rod 43, the lower end of this connecting rod 43 being attached to cross rod 37 of the supplemental frame. Mounted at one end of crank shaft 41 is an operating lever 44, adapted to be held in any adjustable position by a pawl and segment arrangement 45. As will be apparent, by manipulating lever 44, the supplemental frame may be raised and lowered about its pivotal center so that the plows 16, 17 are also raised and lowered and moved relatively to the main frame, longitudinally thereof, to some extent. In this connection, it will be seen that by having the plow standard 18 swingable on crank shaft 19 and extending forwardly therefrom, the furrow opener 16 may be located well in advance of the axle 13 and covering plows may be positioned approximately in the same vertical plane as said axle. It is understood, of course, that the furrow opener can not be positioned too close to the main plow 15, because it is necessary that the soil turned up by the main plow must have time to settle before the furrow is opened for the seed, because if it is not given time to settle, then the opening formed by the furrow opener 16 will be filled by the settling soil before the seeds are deposited therein. In order to provide the necessary space between the main plow and the furrow opener, a great many of the plows of the prior art have found it necessary to extend the main frame a considerable distance in rear of the axle, and mounting the furrow opener the required distance to the rear of said axle. This not only necessitates a longer frame, but it makes it difficult to properly balance the frame on the axle. Another advantage of being able to locate the furrow opener forwardly of the axle and the covering plows in substantially the same plane as the axle, is that such an arrangement insures the seeds being covered with a uniform depth of soil. This is not true where the covering plows are located any appreciable distance behind the axle, because in those instances, if the wheels pass over a high spot, so to speak, into a lower portion of the ground, the covering plows necessarily engage the higher portion of the ground while the wheels are in a lower portion and as a consequence, a greater volume of soil is thrown back over the seeds.

The driver's seat is shown at 46, being supported on a standard 47 which is mounted on the rear cross member 10 of the plow. As before stated, a planting plow has been illustrated in the present instance, but it is deemed unnecessary to show or describe in detail the mechanism for depositing the seeds in the soil. As a consequence, the seed hopper is shown in outline at 48 in Figures 1 and 2, and a portion of the gearing for a seed depositing mechanism is shown in outline at 49, 49a.

What is claimed is:

1. In a plow, the combination of a frame, a shaft journaled in the side members of said frame, offset portions formed on said shaft intermediate said side members and at the exterior of said side members, a plow standard for a plow share attached to the offset portion of the shaft intermediate said side members, brace rods connecting said plow standard with the offset portions of the shaft at the exterior of said sides, and means for rocking said shaft.

2. In a plow, the combination of a frame, a pair of crank shafts journaled in said frame, a plow standard for a plow share pivotally suspended from one shaft, rods secured to said plow standard and the other shaft, there being a pin and slot connection between said rods and plow standard, load bearing members on said rods engaging said plow standard, and means for rocking said shafts.

3. In a plow, the combination of a frame, an axle, ground wheels upon said axle, a plow standard, a main plow share mounted upon said standard forward of said axle, a supplemental plow adjacent a vertical plane through said axle, and means for adjusting the lead of said main plow with respect to said supplemental plow, said means also including means for vertically adjusting the plow standard and share with respect to said frame.

4. In a plow, the combination of a frame, an axle, a plow standard, a main plow share mounted upon said standard forward of said axle, a supplemental plow adjacent a vertical plane through said axle, means for vertically adjusting said supplemental plow with respect to said frame, and means for adjusting the lead of said main plow with respect to said supplemental plow, said last means also including means for vertically adjusting said main plow with respect to said frame.

5. In a plow, the combination of a frame, ground wheels supporting said frame, a crank mounted on and depending from said frame, an operating lever for said crank, a plow standard pivotally supported at its upper end upon the crank, a plow share mounted upon the lower end of said standard, a second crank mounted upon the frame forward of said first crank, an operating lever for said second crank, and a member mounted at its upper end upon said second crank and pivotally attached at its lower end to said plow standard at a point intermediate the first crank and said plow share.

6. In a plow, the combination of a frame, ground wheels supporting said frame, a crank mounted on and depending from said frame, an operating lever for said crank, a plow standard pivotally supported at its upper end upon the crank, a plow share mounted upon the lower end of said standard, a second crank mounted upon the frame forward of said first crank, an operating lever for said second crank, a member mounted at its upper end upon said second crank and pivotally attached at its lower end to said plow standard at a point intermediate the first crank and said plow share, and a drawbar attached at its rear portion to said plow standard and slidably anchored at its front portion to said frame.

7. In a plow, the combination of a frame, ground wheels supporting said frame, a crank mounted on and depending from said frame, an operating lever for said crank, a plow standard pivotally supported at its upper end upon the crank, a plow share mounted upon the lower end of said standard, a second crank mounted on and depending from said frame, an operating lever for said second crank, and a member pivotally attached at its upper end to said second crank, and attached at its lower end to said plow standard adjacent the plow share.

8. In a plow, the combination of a frame, ground wheels supporting said frame, a crank mounted on and depending from said frame and movable to positions on either side of a vertical line through its axis, an operating lever for said crank, a plow standard pivotally supported at its upper end upon the crank, a plow share mounted upon the lower end of said standard, a second crank mounted on and depending from said frame and movable to positions on either side of a vertical line through its axis, an operating lever for said second crank, and a member pivotally attached at its upper end to said second crank and attached at its lower end to said plow standard adjacent the plow share.

ARCHIBALD J. PRATT.